May 13, 1947.　　　J. A. C. YULE　　　2,420,636
PHOTOGRAPHIC MASKING
Filed April 11, 1942　　　4 Sheets-Sheet 1

JOHN A. C. YULE
INVENTOR

BY
ATTY & AG'T

JOHN A.C. YULE
INVENTOR

May 13, 1947.  J. A. C. YULE  2,420,636
PHOTOGRAPHIC MASKING
Filed April 11, 1942  4 Sheets-Sheet 3
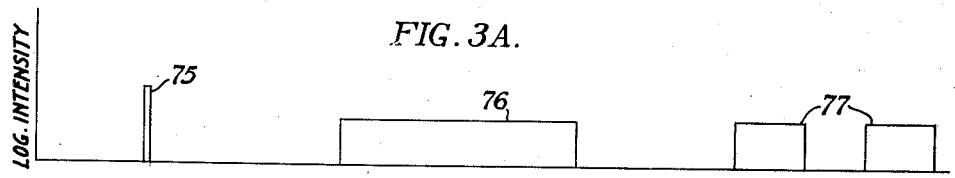
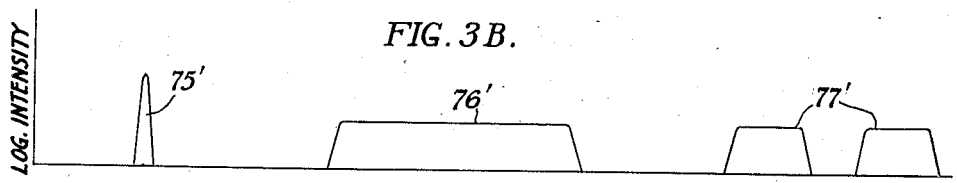
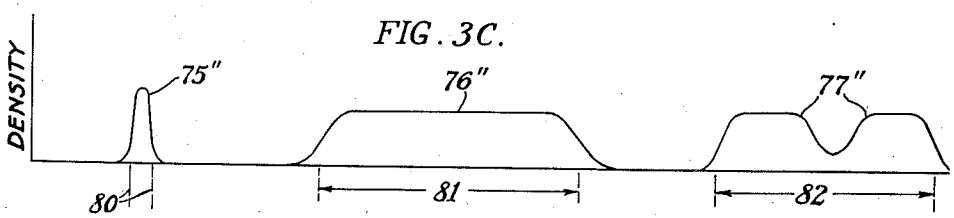
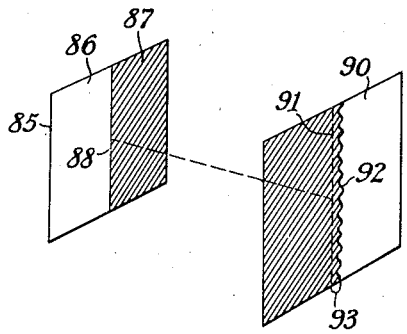
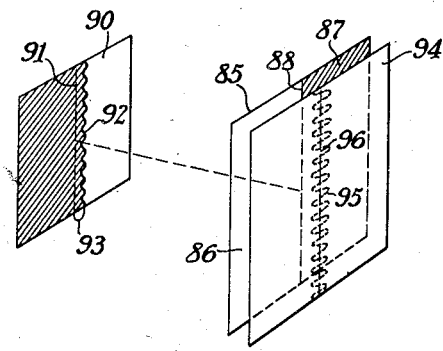
JOHN A.C. YULE
INVENTOR
BY
ATTY & AG'T May 13, 1947. J. A. C. YULE 2,420,636
PHOTOGRAPHIC MASKING
Filed April 11, 1942 4 Sheets-Sheet 4

JOHN A. C. YULE
INVENTOR
BY
ATTY & AG'T

Patented May 13, 1947

2,420,636

UNITED STATES PATENT OFFICE 2,420,636

PHOTOGRAPHIC MASKING

John A. C. Yule, Rochester, N. Y., assignor to Eastman Kodak Company, Rochester, N. Y., a corporation of New Jersey Application April 11, 1942, Serial No. 438,633

18 Claims. (Cl. 95—5)

This invention relates to photographic masks, for example, those used in color correction or tone control.

While the present invention finds its greatest use in connection with color correction masks, its advantages are such that masking during black and white processes is also useful, and hence, the invention will be described in general terms. In either color or black and white processing, a transparency which may be either colored or neutral is usually masked by placing a mask in optical register therewith and also in printing relation therewith, i. e., either in contact or substantially in projected focus during printing from the transparency, again either by contact or projection. The mask may be made directly from the transparency which is to be masked or from a photograph thereof such as when making a mask for a blue separation negative from a green separation negative of the same subject.

It is an object of the invention to provide a method of masking a transparency (or other original) and a combination of a transparency and mask which will give improved definition compared to previous masking methods and combinations.

It is also an object of the invention to give increased tolerance for the registration of a mask. That is, by the present invention the optical or masking registration of the mask and the original is not as critical as formerly.

It is an object of the invention to provide a mask which permits the printing process to retain or even to restore fine details in the picture being printed. This advantage of the invention gives improved texture and brings out the fine details as, for example, in the skin of an orange or of a peach.

These latter advantages are the reasons why it is sometimes desirable to mask even in making black and white prints, utilizing a form of masking according to the present invention of course. The reproduction of line drawings and printed matter is thus greatly enhanced as described in my copending application Serial No. 537,443, filed May 26, 1944, now U. S. Patent No. 2,407,211. When the invention is so used the advantages of the first two objects are also enjoyed. Reference is also made to my copending application Serial No. 526,040, filed March 11, 1944.

According to the present invention, a mask, whatever its purpose, is made and/or used so as to mask diffusely i. e. unsharply rather than sharply. For example, if the mask is printed by contact from a transparency it may be held slightly out of contact while the printing is done by an extended source, e. g., a wide printing light. Different forms of diffusion or unsharpness are possible, for example, if the light source is in the form of a disk or in the form of a ring, the diffusion or unsharpness will be either disk or ring type, respectively. Alternatively and less preferably the mask may be made sharp but held just appreciably out of printing relation with the record it is to mask when printing therefrom. The terms "unsharp" and "unsharpness" are synonymous with, but more definite than, "diffuse" and "diffusion" as here used.

In one preferred embodiment of the invention, the mask is made diffuse i. e. unsharp and also used unsharply, i. e., out of printing relation, e. g., slightly out of contact, when masking the transparency during printing therefrom. In one form of this latter embodiment, the mask is printed by being held in contact with the rear surface of the support for the transparency and is also held in contact with this surface when printing from the transparency (or, when made from one negative and used on another, with the back of the support of the negative which it is to mask).

In the embodiment wherein the mask is held appreciably out of printing relation, e. g., out of contact with the transparency when printing from the combination, the present invention not only can utilize a sharp mask or one with as much diffusion in the case where it is held in contact during use, but even greater diffusion is permitted and desirable. When masking transparencies smaller than four square inches area, for example when duplicating motion picture film such as 16 mm. film each frame of which is very small, this embodiment of the invention should be employed wherein the mask is diffused considerably and is held slightly out of contact with the transparency it is to mask. In any case, the amount of diffusion in the mask is, of course, slight. With larger transparencies any of the three forms of the invention give a highly desirable improvement over sharp masking.

Diffusion or unsharpness is commonly measured in terms of resolving power and for most practical purposes it is perfectly satisfactory to define the diffusion of the present masks in terms of their resolving power. However, resolving power in any record depends on the circle of confusion in that record, which circle of confusion is the sum of two independent factors. The first is the circle of confusion of the transparency or original from which the mask was made and the second is the contribution to confusion introduced during the making of the mask. I feel that the theory which best fits the phenomena of increased definition due to a diffused mask is best defined in terms of the contribution to confusion alone. Contribution to confusion is the diameter of the circle of confusion corresponding to a white perfect point in the transparency from which the mask is printed. If the transparency itself has a circle of confusion relative to a point in some original subject, the contribution to confusion by the printing of the mask is added to the circle of confusion of the transparency to give a sum which constitutes the circle of confusion of the mask itself.

The less preferable embodiment wherein a sharp mask is used out of printing relation is not included in this part of the discussion since it would complicate the language. However, its effective "contribution to confusion" is exactly the same when measured "at the transparency" being masked as is that of the equivalent diffuse mask used in contact. On projection printing, the effective contribution to confusion depends of course on the cone of light entering the lens.

For optimum improvement of definition I have found in some cases that the contribution to confusion should be about $V/5000M$ where $V$ is the normal viewing distance of the final print or projected image to be made from the transparency and $M$ is the magnification of this print or image relative to the transparency. Contributions to confusion less than one-third of this value do not give an appreciable improvement in definition over perfectly sharp masks in exact printing relation. Contributions more than three or four times this optimum value may give an outlining of the details which some observers feel is objectionable but up to 8 times give useful results. However, the larger values are the more useful in the embodiment wherein the mask is diffuse itself and used diffusely; although the contribution is doubled undesired effects cancel out. Thus the preferable range is from $V/15000M$ to $V/1200M$ or even to $V/600M$. This latter value includes the sum of the contribution in a diffuse mask and the contribution when this mask is used out of printing relation. The lower values (down to $V/15000M$) are employed when "the undesired effects" aren't cancelled out. These particular undesired effects consist mainly of an outlining effect due to a shift in the position of the boundaries of detail in the mask.

The normal viewing distance of the final print depends on many factors. (a) In the case of a projected picture the viewing distance is fixed by the distance between the screen and the point at which the observer is seated. For amateur motion picture and still picture projection systems the usual best viewing distance is about twice the diagonal of the projected picture; in any case this value can be used as a criterion for calculating the best diffusion. (b) For very small prints, roughly those less than twenty square inches area or less than five inches on the diagonal, the normal viewing distance is about ten inches. (c) For very large prints, there are two normal viewing distances, one taking in the whole picture and the other examining details thereof, the latter being ten inches if the definition in the print warrants it. The longer distance is not the controlling one with respect to the present invention and the shorter distance, namely, the detail examining one, is generally greater than ten inches because the circle of confusion is so large that the observer automatically positions himself at the distance at which the lack of detail is no longer apparent. This distance is usually about five thousand times the circle of confusion of the final print. (d) Halftone prints are observed in the same way as large continuous tone prints and experience has shown that the viewing distance normally assumed for examining detail is about five thousand times $\frac{1}{2}N$ where $N$ is the number of screen lines per inch in the print. Whether or not these limitations accord with all theories of viewing, they are those generally accepted and they do fit with the actual values found for the present invention.

Applying the general rule to each of these cases, namely, that the contribution to confusion should be $V/5000M$, we find the following ways of writing this same equation for particular cases. (a) For projected pictures, the contribution to confusion should be twice the diagonal of the projected picture divided by five thousand times the magnification of the projected picture, which is equal to the diagonal of the transparency divided by 2500. (b) For small prints, the contribution to confusion should be $1/500M$ inches where $M$ is the magnification of this print relative to the transparency. (c) For large prints, in which the definition is so poor that the critical viewing distance is more than ten inches, the contribution to confusion should equal the circle of confusion in the transparency which should be masked. That is, the magnification of the circle of confusion in the large print cancels out the $M$ of our formula and the five thousand factor appears both in the divisor and dividend. The resulting circle of confusion in the mask should thus be just twice the circle of confusion in the transparency. (d) Applying the same rule to halftones and using the criterion that $\frac{1}{2}N$ be taken as the circle of confusion of the final print, we note that the contribution to confusion should be $\frac{1}{2}MN$.

In each of these cases a value between one-third and about four to even eight times the optimum value given is useful.

Incidentally, there are reasons to believe that the gamma of the mask, i. e., the masking factor has some effect on the optimum value of confusion. Lower contrast masks can use greater diffusion. However, the effect is small and the total range of useful values encompasses the minor variations more or less completely.

All of the discussion above and that in connection with the description of the drawings refers mainly to a mask which is negative relative to the original or record it is masking, i. e., is negative if the record is positive and is positive if the record is negative. When the two images being combined are positive with respect to each other, the tolerance in registration is still available but the other advantages (better contrast of fine detail and definition of detail) are lost. In fact in such cases the ease of registration is really obtained at the expense of good definition whereas in the use of a "negative" mask all three properties are improved together.

In the following description of the invention with reference to the accompanying drawings, I have included a theory which may be the explanation as to why diffuse masks according to the present invention give better definition than sharp masks, secondly, why they permit greater tolerance in mask registration and thirdly why they give better texture.

In the accompanying drawings:

Figs. 3A to 3C illustrate different types of unsharpness;

Figs. 4A and 4B illustrate how the preferred embodiment of the invention prevents loss of contrast of fine detail;

Figure 1A:
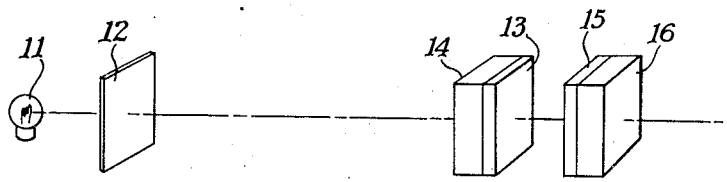
Figs. 1A to 1F illustrate various ways of making masks.

In Fig. 1A a diffuse or unsharp mask is made by contact printing with the sensitive surface slightly out of printing relation. Light from a lamp 11 passes through an opal glass 12 and illuminates a transparency 13 carried on a support 14 to expose a sensitive surface 15 carried on a support 16. The light diffusing surface 12 acts as an extended source of light so that there is in the mask 15 (after processing) a contribution to confusion depending on the separation of the transparency 13 and the masking material 15. The material 15 is thus just appreciably out of printing relation with respect to the layer 13. The exact distance between these two layers necessary to constitute being "appreciably out of printing relation" depends on the extent of the printing light source 12. If a point source were used, large separations between the layers 13 and 15 would still give a sharp mask.

Figure 1B:
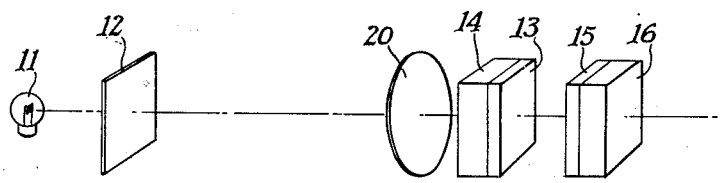

In Fig. 1B collimating lens 20 is added so that the size of the mask image is the same as that of the transparency.

Figure 1C:
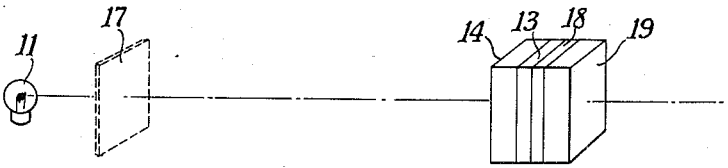

In Fig. 1C the sensitive material 18 carried by a support 19 is placed in contact with the layer 13 to print a sharp mask. The presence or absence of a ground glass as shown by broken lines 17 is immaterial if the contact between the layers 13 and 18 is good. Thus two layers in good contact are one form of "exact" printing relation. If printed by projection, layers in conjugate planes, i. e., in focus, are said to be in exact printing relation. As pointed out above, the extent of the region to be considered "in printing relation" depends on the effective area of the light source or at least on the cone of light constituting the printing beam at each point.

Figure 1D:
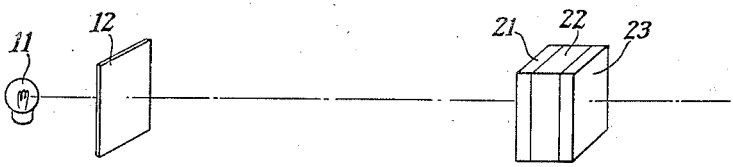

In Fig. 1D a preferred embodiment of the invention is illustrated in which the transparency 21 carried on a support 22 is provided with a sensitive layer 23 coated on the back of the support. In both Figs. 1A and 1D the beam incident on the transparency should be collimated or should have the same degree of vergence as the beam to be used when printing from the combination so that the magnification of the mask shall be effectively unity.

Figure 1E:
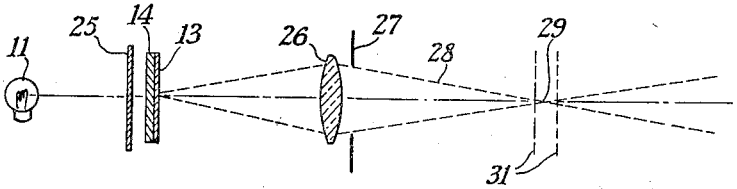

In Fig. 1E the transparency 13 is illuminated by light source 11 and opal glass 25 and an image thereof is projected by a lens 26 coming to focus at the point 29 as illustrated by the rays 28. A sharp mask is obtained if the sensitive layer is placed at the point 29 orthogonal to the optic axis. To obtain a diffuse mask, the sensitive layer should be placed outside the planes indicated by the broken lines 31. Obviously, the separation of these planes for any given degree of diffusion depends on the angle of the cone of light, and hence, on the diameter of the diaphragm 27 adjacent to the lens 26. That is, if the lens 26 were stopped down to a very small aperture one would have to place the sensitive layer farther from the point 29 in order to be just appreciably out of printing relation.

Figure 1F:
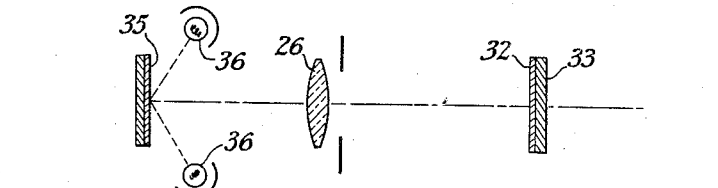

In Fig. 1F an original scene or opaque print thereof 35 is illuminated by lights 36 so that an image is projected through a lens 26 to expose a sensitive layer 22 carried on support 23. To get a sharp or a diffuse mask, the layer 32 is placed exactly in or appreciably out of printing relation respectively.

Figure 2A:
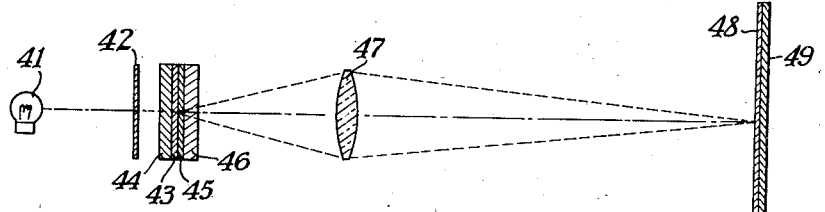
Figs. 2A to 2F illustrate methods of using these masks according to the invention.

In Fig. 2A a lamp 41 with opal glass 42 illuminates a transparency 43 carried by a support 44. In contact with this transparency, according to the invention, is placed a diffused mask 45 carried on support 46. The mask may be made from the transparency itself as illustrated in Fig. 1B or 1E or may be made from a corresponding photograph such as a different color separation negative. Since the sensitive material to be printed from the transparency 43 should be in exact printing relation therewith, the support 46 would have to be quite thin if the print were to be made by contact. Also, it would be necessary to use a small source of light. However, it is more convenient to print by projection and therefore an image of the transparency 43 is projected by a lens 47 to expose a sensitive layer 48 carried on a support 49.

Figure 2B:
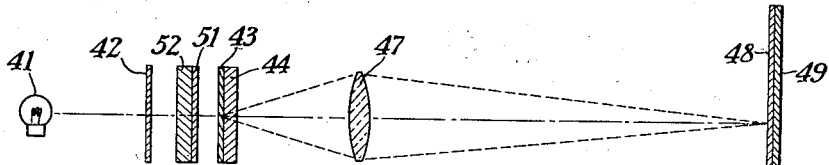

In Fig. 2B a similar arrangement is employed by the mask 51 carried on a support 52, positioned just appreciably out of printing relation with the layer 43 and therefore also just appreciably out of printing relation with the layer 48. In this case the mask 51 may be either sharp or diffuse, but is preferably diffuse. Since it is probably diffusing (whether sharp or diffuse) it is better to place it ahead of the transparency as shown than between the transparency and the lens.

Figure 2C:
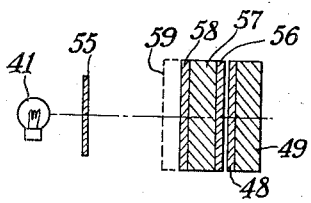

If the mask is to be employed out of printing relation with the transparency, a print may be made from the combination by contact as illustrated in Fig. 2C. In this case an opal glass 55 in front of the light source 41 acts as an extended source of light to print a transparency 56 carried on a support 57, the sensitive layer 48 being in contact with the transparency. The mask 58 is placed in contact with the back of the support 57 and is either carried by this same support or a separate support shown by broken line 59. This is, of course, the preferred manner of using the mask made as illustrated in Fig. 1D.

Figure 2D:
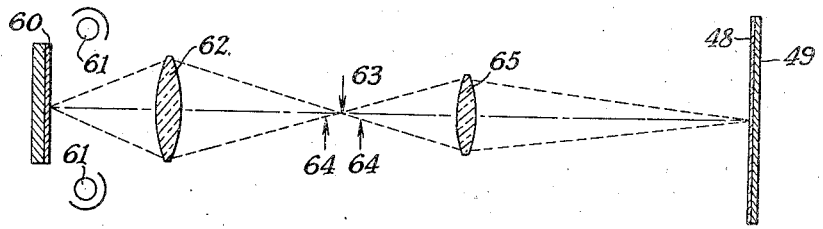

Since both the image of the mask and the image of the transparency simultaneously expose the sensitive layer 48, either or both may be projected thereonto. In Fig. 2D an opaque original 60 illuminated by lamps 61 exposes the sensitive layer 48 by relaid projection by lenses 62 and 65. If a diffuse mask is used it may be placed at the point 63 in printing relation with the original or slightly out of printing relation at the points 64. If a sharp mask is used, it must be out of printing relation such as at the points 64. The fact that either a sharp or a diffuse mask is diffusing must be kept in mind when positioning one in such a system.

Figure 2E:
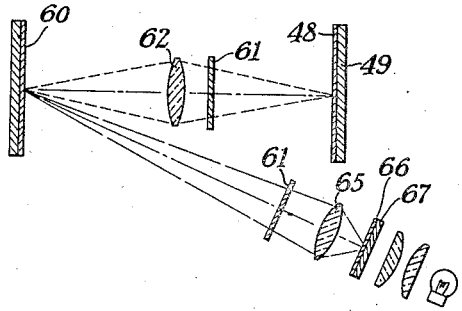

In Fig. 2E the original 60 is illuminated solely by the image of a mask 66 (on a support 67) projected by a lens 65. The original thus masked is projected by a lens 62 onto the sensitive layer 48. The mask 66 is either diffuse or out of printing relation, i. e., out of focus with the original 60, or both. To prevent glare, polarizing filters 61 properly oriented, i. e., "crossed" may be used in front of the projection lenses 62 and 65 as shown.

Figure 2F:
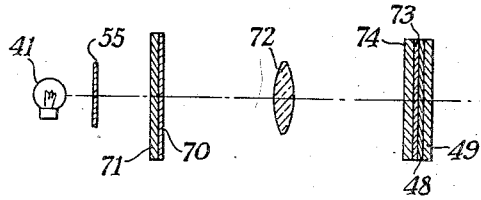

In Fig. 2F the sensitive surface 48 is printed in contact with a transparency 73 carried by a support 74, but the image of the mask 70 carried on a support 71 is projected by a lens 72 onto the sensitive layer 43. In all embodiments, the transparency or record is always in printing relation with the sensitive surface and the mask is either in or out of printing relation and is either diffuse or sharp. If sharp, it must be out of printing relation. Preferably, the mask is diffuse and out of printing relation. The transparency may be multicolored, monochromous or black and white; similarly, the mask may be multicolored, monochromous or black and white and may be used simply to provide the advantages of the present invention or for the simultaneous attainment of other purposes, such as color correction or tone correction, to which masks are usually put.

In Fig. 3A, the graph 75 represents the light distribution of a point source, the graph 76 represents the light distribution of an extended source of disk shape and the graph 77 represents the light distribution of a ring source. In Fig. 3B is illustrated the distribution of light from such sources as it strikes the emulsion in which the mask is to be made. The normal scattering of light by the transparency and the mask emulsion gives the cone shape to the graph 75' and gives the slope to the sides of the curves 76' and 77' corresponding to the light sources illustrated by corresponding numbers in Fig. 3A. That is, the graphs in Fig. 3B show the light distribution through a pin hole of the transparency from the light sources illustrated in Fig. 3A. If the sensitive surface were in contact with the transparency or otherwise in exact printing relation therewith, the curves of Fig. 3B would all be the same and would correspond to a cone similar to 75' but of even narrower apex angle.

After processing, the mask density is illustrated by curves of Fig. 3C each labeled with a double prime number to correspond to Figs. 3A and 3B. The slope of the sides of each graph in Fig. 3C makes it theoretically difficult to state just where the circle of confusion is to be measured. The dotted lines 80, 81 and 82 are drawn to show approximately the diameter of the circle of confusion for each type. In practice, however, measurements to the degree of accuracy required may be made easily under a microscope and the difference between the circle of confusion measured at the top of the graph and that measured at the lowest point is negligible compared to the effects now being considered. Thus, 81 or 82 corresponds to a circle of confusion in accordance with the present invention.

Figs. 4A and 4B illustrate the advantages of both making and using a mask unsharply or diffusely. In Fig. 4A a section 85 of a transparency to be masked is made up of a light area 86 and a dark area 87 divided by a line 88. When a mask 89 is made diffusely from this section 85, the division between the light and dark areas of a mask does not follow along the center line corresponding geometrically to the divided line 88, but due to the well known encroachment of light into dark regions, this division is shifted a distance 93 to get a diffuse edge illustrated by a wavy line 92. From halation phenomena it is well known that light encroaches on dark rather than vice versa. Mathematically, this is due to the fact that when logarithms are taken to give photographic density the addition of a small amount of light at low intensities has much greater effect than subtraction of equal amount of light at high intensities. This encroachment would have a tendency to cause an undesirable outlining effect (if the diffusion of the mask is greater than the tolerable value and if the effect is not cancelled out as explained in connection with Fig. 4B.)

In Fig. 4B the reverse phenomenon takes place. In this figure the original section 85 is in printing relation with a sensitive surface 94 and the mask 90 is just appreciably out of printing relation with each of them. Again due to the encroachment of light on dark, the shadow of the diffuse division 92 is shifted back so that it falls as illustrated by the curved and broken line 96 right on the geometrical image 95 of the divided line 91 and also of the divided line 88.

This compensating effect which occurs only in that embodiment in which both the mask and the masking are diffuse (unsharp), permits even greater diffusion in the mask. The total contribution to confusion of the mask measured at the transparency is of course the sum of the contribution to confusion in the mask itself and the effect produced by having it out of printing relation when masking, but the effect on detail contrast is at least partially cancelled out. The doubling of the diffusion is illustrated graphically by the amplitude of the waveness of line 96 being twice that of line 92. Therefore, in this preferred embodiment of the invention a greater degree of confusion is permissible and since the other advantages of the invention are thereby enhanced, such increase of diffusion is desirable and useful.

Figure 5:
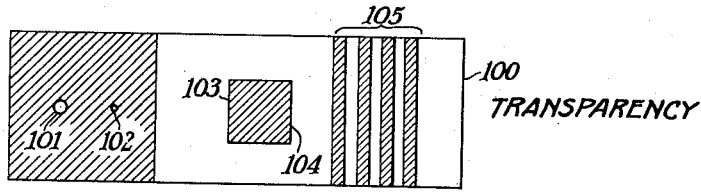
Figs. 5 to 9 illustrate the theories involved in the improved definition, the greater registration tolerance and the improved texture.

In addition to this latter theory, I will now describe the three separate phenomena of the invention with respect to a hypothetical transparency 100 shown in Fig. 5. These various theories are given to aid in understanding the factors involved but the actual factors are empirically derived and they constitute the important characteristics of the invention even if the theory or theories are incomplete.

In Fig. 5 the hypothetical positive transparency 100 includes a shaded area having therein two light spots 101 and 102. The light spot 101 represents the circle of confusion of the transparency relative to a theoretical point of light in some positive original. The spot 102 is supposed to be a point of light in the transparency itself having practically zero circle of confusion. A dark detail having sides 103 and 104 is shown on a light background and fine detail is illustrated by a series of parallel lines 105 which are so close together as to approach the limit of resolution in the transparency.

Figure 6:
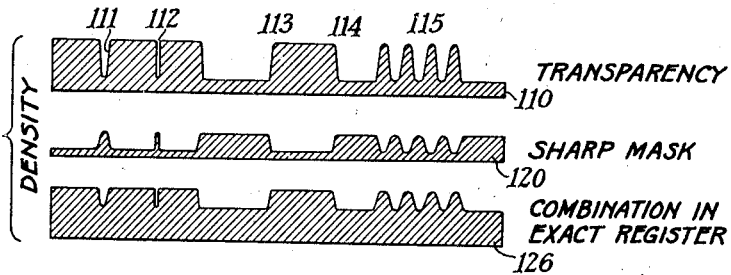

In Fig. 6 the graph 110 represents the density of a cross section of the transparency 100. It will be noted that the details 111, 113, 114 and 115 all have approximately the same edge slope. The detail 112 being a theoretical pin point is shown with straight sides. The fine detail 115 may for convenience be considered as a sine wave. A sharp mask having practically no contribution to confusion is made from the transparency and its density is shown by the graph 120. For convenience a 50% mask is considered so that the variations in this density are exactly one half those in the transparency. A 50% mask is used for certain forms of color correction as is well known to those working in this field. When this mask 120 is placed in perfect register and in printing relation with the transparency 110 the density of the combination is shown by the curve 126. Effectively this is just the inverse of the curve 120. Since the contrast of all details has been reduced to half, subsequent printing from this combination will involve processing to a high gamma to compensate approximately for the falling off in contrast or at least to give proper tone rendition. This will bring the detail back to exactly the same as that shown by the curve 110. Thus, except for color correction or other purposes for which the masking is employed, a sharp mask in exact register and in exact printing relation can be considered as having no effect on the details or fine details.

Figure 7:
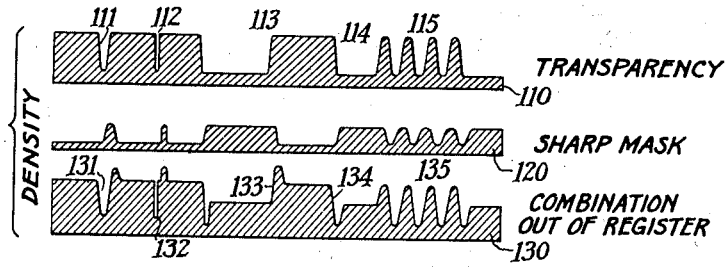

In Fig. 7 the effect of lack of register of a sharp mask which is in exact printing relation is illustrated. That is, the curve 120 is shifted slightly to the right with respect to the curve 110 in Fig. 7. The net result is shown by the curve 130. In this curve the detail 131 is more contrasty than the corresponding detail of the curve 126 and includes a hump on the right thereof. The same is true and to a greater extent of the detail 132. Similarly, the sides 133 and 134 of the large dark detail illustrated include a black line along one side of the detail and a white line along the other side illustrated respectively by a hump next to 133 and the valley next to the edge 134. This outlining is quite objectionable especially since it is unsymmetrical and gives an undesirable amount of bas relief. The fine lines 105, however, are such that the outlining of one line runs into the next and gives increased contrast as illustrated by the increased height of the details 134 as compared to the corresponding detail in the curve 126. When a print is made from this combination and processed to a high gamma to bring the overall contrast back to normal, the increased contrast of the detail 135 gives quite a useful effect. However this only occurs with details of the sine wave form shown, and the general effect is well known to be extremely objectionable.

Figure 8:
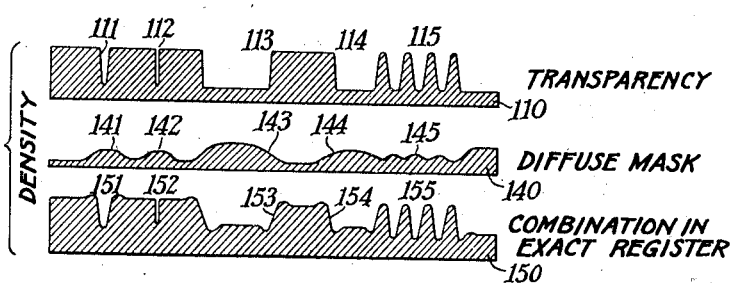

In Fig. 8 is illustrated the effect of diffuse masking according to the invention. This may be due either to a diffuse mask in exact printing relation with the transparency or secondly, to a sharp mask just appreciably out of printing relation with the transparency or thirdly and preferably, to a diffuse mask just appreciably out of printing relation with the transparency. The diffuse mask has a density represented by the graph 140 and the contribution to confusion is best seen in the detail 142 corresponding to the pin point 102 so that this detail 142 has an appearance similar to the graph 76" of Fig. 3C. This contribution to confusion added to the circle of confusion 101 of the transparency gives the detail 141. The side shift or encroachment of light onto dark as discussed in connection with Figs. 4A and 4B is not emphasized in the drawing of the details 143 and 144, since it is a separate effect from that to be discussed now. However, the diffusion either with or without this encroachment causes a considerable loss of contrast in the fine details 145 as shown.

The combination of this diffuse mask in exact register (and in or just appreciably out of printing relation) gives a graph 150 having the following characteristics. The sides of the detail 151 includes a symmetrical hump on each side of the detail; the same is true of the detail 152. This slight outlining even when it includes a slight valley at low densities and a slight hump at high densities as illustrated in details 153 and 154, is far from objectionable and is actually quite pleasing. Similarly, the lack of contrast in the detail 145 causes less reduction of the contrast in the original fine detail 115 giving a high contrasty detail 155. When a print at high contrast is made from this combination, the contrast of fine detail is greatly enhanced and ordinary detail is gently outlined with very pleasing though hardly discernable effect. Furthermore, in the preferred embodiment of the invention wherein the mask is both made and used diffusely as discussed in connection with Figs. 4A and 4B the outlining is held within the desirable limits even when the fine detail is enhanced as much as possible.

Figure 9:
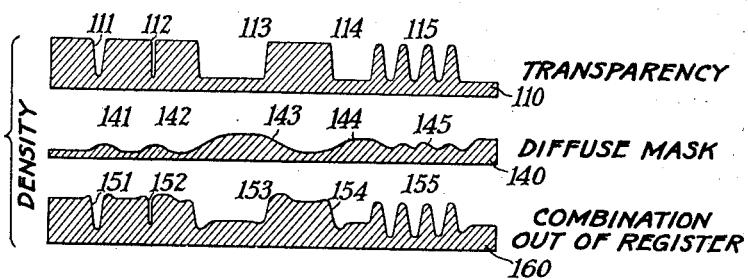

Still another advantage of the diffused mask is illustrated in Fig. 9 in which the curve 140 is shifted to the right in the same way as the curve 120 was shifted in Fig. 7. The density of the resulting combination as shown by curve 160 has all of the advantages of the curve 150 (and also of the detail 135 of curve 130) without any of the disadvantages of the combination illustrated by curve 130. The outlining of detail as shown for elements 161, 162 and particularly for the sides 163 and 164 of a large detail is for practical purposes just the same as for curve 150. There is a slight dissymmetry tending toward bas relief, but this is not nearly as great as in curve 130 and it is counteracted by the symmetry of the outlining due to the diffuseness of the mask. Furthermore, this gentle outlining remains, enhancing the picture although the reason for the enhancement is not obvious to anyone casually inspecting the resulting picture. The fine detail 165 has the greatly increased contrast due both to the shift, as would the detail 135 and to the low contrast of the mask as would the detail 155.

Thus, the diffuse mask gives improved definition, enhanced fine detail and greater tolerance in mask registration.

As pointed out before the description of the drawings, the amount of diffusion which is preferable is between V/15000M and V/600M where V is the normal viewing distance of the final print and M is the magnification of the print relative to the transparency being masked. One particularly useful application of the invention is that involved when color separation negatives are made from a positive transparency, especially when the transparency is at least a four square inch area. When the final print is to be viewed at a distance of 10", the mask should preferably have a contribution to confusion between 1/1500M and 1/60M inches wherein M is the magnification of the print relative to the transparency. Of course, this magnification may be introduced in two steps if the negatives are magnified relative to the transparency and then the print is magnified relative to the negatives.

In another case wherein a large print is made with such definition that even the critical viewing distance is greater than 10", the contribution to confusion as given by the general formula should preferably be about equal to the circle of confusion in the transparency; the range is between ⅓ and 8 times this circle of confusion. This contribution to confusion added to the circle of confusion in the transparency means that the circle of confusion in the mask is between four-thirds and nine times the circle of confusion of the transparency.

In still another case, namely, in the duplicating of 16 mm. color films, the preferred embodiment employing a mask both made and used diffusely has been found eminently satisfactory, particularly the preferred form thereof in which the sensitive layer for the mask is coated in the back of the support and is printed through this support by an extended light source and remains on the back of the support when the original is duplicated either by contact or projection printing. The circle of confusion in the mask in this case is controlled by the diameter and distance of the light source during printing of the mask. The actual value which has been found to be most desirable is that in which the contribution to confusion is about 1/1000 of the diagonal of the 16 mm. frame (about 12.5 mm.) which value falls within the upper part of the preferred range and actually is about 2½ times that which is given by the formula V/5000M. This large value is permissible due partially to the phenomena discussed in connection with Figs. 4A and 4B and partially to the fact that only a 25% mask is usually employed when duplicating 16 mm. colored film. This brings out the fact that both of these phenomena are of a smaller order than that involved in the broad invention so that they still fall within the preferred range defined for the contribution to confusion.

In connection with duplicating 16-mm. color film it has been found that the definition is surprisingly better than that obtained by ordinary duplicating methods in which no masking at all is employed. It is thus very much better than that obtained when sharp masking is employed.

In connection with the effect of the masking factor on the permissible range of confusion it may be reasoned from the above discussed theory that the higher the masking factor the lower the permissible diffusion. This point has not been definitely proven but an expression for the range of confusion as being between V/30000FM and V/1200FM where F is the masking factor does appear to fit the empirical result as well as the general range given above (V/15000M to V/600M) which doesn't involve the masking factor. For all practical purposes and normal masking, either expression covers the phenomena involved.

Diffusing or diffusion systems, such as those employing a ground glass somewhere between a negative and a positive being printed therefrom, have of course nothing to do with the present invention. A diffuse, diffused or confused image is not necessarily diffusing and the preferred embodiments of the invention employ masks which are as non-diffusing as it is possible to make them. An out-of-focus image is "diffuse" but does not diffuse the light any more than a sharp image.

To distinguish from such diffusing systems and even selectively diffusing ones, it is pointed out that my mask always contains a "punctual" image, i. e., one including some record of every point of positive or negative from which it was printed. Of course, the term "punctual" must be broad enough to include diffuse images in which the record of each point includes a circle of confusion and other characteristics of ordinary photographic prints such as relative loss of detail in extreme highlights and shadows, but it definitely distinguishes over shadows or any artificial delineation of an image.

The fact that the mask is always made (by punctual printing) from a photographic record (the one to be masked or a similar one) provides uniform control of the image diffusion. The contribution to confusion is the same at every point of the mask and is added to whatever circles of confusion are at the corresponding points of the record. On the other hand, the making of the first record from some original scene does not allow such control since changing focus increases diffusion at one point but increases sharpness at some other point for an object in the scene at a different object distance.

In the commercial promotion of this invention I have adopted almost universally the term "unsharp" in preference to either "diffuse" or "blurred" referring to this process and these masks. Those comparing this specification with other descriptions should not expect any general distinction in meaning between these various terms.

Having thus described various embodiments of my invention, I wish to point out that it is not limited to these arrangements but is of the scope of the appended claims.

What I claim and desire to secure by Letters Patent of the United States is:

1. The method of making a photo print of magnification M and small circle of confusion C from a sharp colored record which comprises making a mask by punctual printing from the record onto sensitive material and by processing the material to a negative relative to the record and to a contrast less than that of the record, unsharply masking the record by said mask, the unsharpness being between $$\frac{C}{3M} \text{ and } \frac{25C}{3M}$$

whereby it is sufficient to increase apparent detail contrast relative to over all contrast of the record but not sufficient to be apparent under normal conditions of viewing the combination of the record and mask or a print therefrom at a distance of about 5000C and printing sharply from the record as unsharply masked.

2. The method according to claim 1 in which said mask is made unsharply.

3. The method according to claim 1 in which said mask is made unsharply and is also placed slightly out of printing relation with the record when printing therefrom.

4. The method according to claim 1 in which the mask is made sharply and is placed slightly out of printing relation with the record when printing therefrom.

5. The method according to claim 1 in which the record is a transparent continuous tone one.

6. The method of making a photo print of magnification M and small circle of confusion C from a sharp transparent colored record of an original which comprises making a color correcting mask by punctual printing from a photograph selected from the group consisting of the record and other records of the same original, the printing being onto sensitive material, and by processing the material to a negative relative to the first mentioned record and to a color correcting contrast less than that of the record, unsharply masking the record by said mask, the unsharpness being between $$\frac{C}{3M} \text{ and } \frac{25C}{3M}$$

whereby it is sufficient to increase apparent detail contrast relative to over all contrast of the record but not sufficient to be apparent under normal conditions of viewing the combination of the record and mask or a print therefrom at a distance of about 5000C and printing sharply from the record as unsharply masked.

7. The method of masking a record of an original from which record a print is to be made with a magnification M relative to the record to be viewed at a viewing distance V where V is about 5000 times the circle of confusion of said print which method comprises making a mask negative to the record and with a contrast less than that of the record by punctual printing from a photograph selected from the group consisting of said record and other records of the same original holding in masking register and approximately in printing relation with the record the mask with a contribution to confusion between $$\frac{V}{15000M} \text{ and } \frac{V}{600M}$$

measured at the record and printing from the record so masked.

8. A method according to claim 7 in which said holding consists of holding said mask just appreciably out of exact printing relation with the record when printing from the latter.

9. The method according to claim 7 in which the mask itself is made slightly out of printing relation with the photograph and is diffuse with a contribution to confusion measured at the mask also between $$\frac{V}{15000M} \text{ and } \frac{V}{600M}$$

10. The method of masking a transparency of an original which transparency has more than four square inches area and from which a print is to be made with a magnification M relative to the transparency intended to be viewed at a distance V where V is about 5000 times the circle of confusion of said print which method comprises making a diffused mask for the transparency negative to the transparency and with a contrast less than that of the transparency with a contribution to confusion between $$\frac{V}{15000M} \text{ and } \frac{V}{1200M}$$

by punctual printing slightly out of printing relation from a photograph selected from the group consisting of the transparency and other records of the same original and holding said mask in masking register and approximately in contact with the transparency when printing therefrom.

11. The method of masking a transparency of an original which transparency has more than four square inches area and from which a relatively small print is to be made of less than twenty square inches area and magnification M relative to the transparency which method comprises making a diffused mask for the transparency negative to the transparency and with a contrast less than that of the transparency with a contribution to confusion between $$\frac{1}{1500M} \text{ and } \frac{1}{120M}$$

inches by punctual printing slightly out of printing relation from a photograph selected from the group consisting of the transparency and other records of the same original and holding said mask in masking register, and approximately in contact, with the transparency when printing therefrom.

12. A method of masking a transparency of an original from which transparency a relatively small print is to be made of less than twenty square inches area and magnification M relative to the transparency which method comprises making a diffused mask for the transparency negative to the transparency and with a contrast less than that of the transparency with a contribution to confusion between $$\frac{1}{1500M} \text{ and } \frac{1}{60M}$$

inches by punctual printing slightly out of printing relation from a photograph selected from the group consisting of the transparency and other records of the same original and holding said mask in masking register and out of printing relation with the transparency by an amount giving at the transparency an additional contribution to confusion equal to that of the mask when printing from the transparency.

13. The method of masking a transparency of an original which transparency has more than four square inches area and from which a relatively large print is to be made of more than twenty square inches area which method comprises making a diffused mask for the transparency negative to the transparency and with a contrast less than that of the transparency with a circle of confusion between four thirds and nine times the circle of confusion of the transparency by punctual printing slightly out of printing relation from a photograph selected from the group consisting of the transparency and other records of the same original and holding said mask in masking register with the transparency when printing therefrom.

14. The method of masking a transparency of an original from which transparency a relatively large print is to be made of more than twenty square inches area which method comprises making a diffused mask for the transparency negative to the transparency and with a contrast less than that of the transparency with a contribution to confusion between $\frac{1}{3}$ and eight times the circle of confusion of the transparency by punctual printing slightly out of printing relation from a photograph selected from the group consisting of the transparency and other records of the same original and holding said mask in masking register and slightly out of printing relation with the transparency by an amount giving at the transparency an equal additional contribution to confusion when printing from the transparency.

15. The method of masking a transparency of an original which transparency has diagonal D and from which a duplicate is to be made for projection, which method comprises making a mask for the transparency negative to the transparency and with a contrast less than that of the transparency with a contribution to confusion between $$\frac{D}{7500} \text{ and } \frac{D}{300}$$

by punctual printing slightly out of printing relation from a photograph selected from the group consisting of the transparency and other records of the same original and holding said mask in masking register and slightly out of printing relation with the transparency when printing therefrom.

16. The method of making a transparency of an original from which transparency a halftone print of magnification M relative to the transparency and N elements per inch is to be made which method comprises making a diffused mask for the transparency negative to the transparency and with a contrast less than that of the transparency with a contribution to confusion between $$\frac{1}{6MN} \text{ and } \frac{2}{MN}$$

by punctual printing slightly out of printing relation from a photograph selected from the group consisting of the transparency and other records of the same original and holding said mask in masking register with the transparency when printing therefrom.

17. The method of masking a record of an original from which record an image is to be made with a magnification M relative to the record to be viewed at a viewing distance V where V is about 5000 times the circle of confusion of said image, the mask to have a masking factor F less than unity, which method comprises making a diffused mask negative to the record with masking factor F for the record with a contribution to confusion between $$\frac{V}{30000FM} \text{ and } \frac{V}{1200FM}$$

by punctual printing slightly out of printing relation from a photograph selected from the group consisting of said record and other records of the same original and holding said mask in masking register with the transparency when printing therefrom.

18. The method according to claim 17 in which said holding consists of holding said mask in masking register and just appreciably out of printing relation with the record when printing from the latter.

JOHN A. C. YULE.

REFERENCES CITED

The following references are of record in the file of this patent:

UNITED STATES PATENTS

| Number | Name | Date |
|---|---|---|
| 774,549 | Baese | Nov. 8, 1904 |
| 812,748 | Ippers | Feb. 13, 1906 |
| 1,356,442 | Garbutt | Oct. 19, 1920 |
| 1,960,373 | Dreyer | May 29, 1934 |
| 2,208,275 | Dreyer | Jan. 21, 1936 |
| 2,083,215 | Balaban | June 8, 1937 |
| 2,179,786 | Hardy | Nov. 14, 1939 |
| 2,246,561 | Wheelan et al. | June 24, 1941 |
| 2,281,033 | Garity | Apr. 28, 1942 |
| 1,677,965 | Fruwirth | July 24, 1928 |
| 1,899,962 | Higginbotham | Mar. 7, 1933 |
| 2,183,598 | Weaver | Dec. 19, 1939 |
| 2,340,656 | Gaspar | Feb. 1, 1944 |
| 1,725,395 | Fruwirth | Aug. 20, 1929 |
| 2,193,931 | Michaelis | Mar. 19, 1940 |
| 2,241,413 | Michaelis | May 13, 1941 |

FOREIGN PATENTS

| Number | Country | Date |
|---|---|---|
| 494,341 | Great Britain | Oct. 24, 1938 |
| 80,038 | Germany | Feb. 26, 1895 |
| 365,493 | Germany | Dec. 16, 1922 |
| 405,764 | Germany | Nov. 7, 1924 |
| 532,233 | Germany | Apr. 5, 1932 |

OTHER REFERENCES

Clerc, "Photography, Theory and Practice," 1937, p. 319. (Copy in Div. 7.) Published by Sir Isaac Pitman & Sons, Ltd., New York. Claims 2 to 5, 8 to 29, and 31 to 38 are in the case.

Spiegler and Juris, Photographische Korrespondenz, Band 67, 1931, pp. 4–9; Band 69, 1933, pp. 36–41. (Copies in S. L.).